US005193951A

United States Patent [19]

[11] Patent Number: 5,193,951

Schimke

[45] Date of Patent: Mar. 16, 1993

[54] WOOD-DRILLING BIT

[75] Inventor: Thomas O. Schimke, Louisville, Ky.

[73] Assignee: Vermont American Corporation, Louisville, Ky.

[21] Appl. No.: 702,275

[22] Filed: May 17, 1991

Related U.S. Application Data

[63] Continuation of Ser. No. 450,858, Dec. 14, 1989, abandoned, which is a continuation-in-part of Ser. No. 236,017, Aug. 24, 1988, abandoned.

[51] Int. Cl.[5] .............................................. B23B 51/02

[52] U.S. Cl. .................................... 408/233; 408/225; 408/214

[58] Field of Search ................ 279/7, 99, 8; 76/108.1, 76/108.4, 102; 408/201, 211-214, 200, 225, 223, 231, 233; 175/320, 327, 408; 403/259, 261, 266, 343

[56] References Cited

U.S. PATENT DOCUMENTS

| | | | |
|---|---|---|---|
| Re. 16,061 | 5/1925 | Thurston | 175/320 |
| 1,409,753 | 3/1922 | Moore | 76/108.6 |
| 1,943,879 | 1/1934 | Rea | 279/99 |
| 2,593,823 | 4/1952 | Wilson . | |
| 3,876,319 | 4/1975 | Meyer | 279/99 |
| 4,484,833 | 11/1984 | Gallagher | 403/266 X |
| 4,658,915 | 4/1987 | Goris et al. | 403/343 X |

FOREIGN PATENT DOCUMENTS

| | | | |
|---|---|---|---|
| 465604 | 5/1950 | Canada | 175/406 |

*Primary Examiner*—Daniel W. Howell

*Attorney, Agent, or Firm*—Middleton & Reutlinger

[57] ABSTRACT

A drill bit includes an elongated shaft with a threaded male end and a cutting head with an axial through-bore having female threads to receive the male end of said shaft in threaded engagement, and there is a bearing surface area between the shaft and the cutting head above the threaded portion which provides for proper alignment and reduced stresses.

14 Claims, 1 Drawing Sheet

WOOD-DRILLING BIT

This is a continuation of application Ser. No. 07/450,858 filed on Dec. 14, 1989, abandoned which is a continuation-in-part of U.S. patent application Ser. No. 07/236,017 filed Aug. 24, 1988, abandoned.

BACKGROUND OF THE INVENTION

Thin, one-piece spade bits, such as that shown in U.S. Pat. No. 4,682,917 "Williams", are effective for boring holes into wood only up to 1½ inch diameter. These spade bits include a central axial projection, which serves as a pilot, and forward edges which serve as cutting edges. In order to bore larger holes in the range of up to 3 inch diameter, a heavier cutting head is needed.

Self-feeding wood bits with heavier cutting heads are known in the art. Those bits have a pilot point with threads which pull the bit into the wood. They perform better than spade bits, because they cut faster and require little axial force. With a heavier cutting head, it becomes quite difficult and expensive to form the bit as a single piece. Therefore, the tendency in the art has been to make the bit in several pieces and then fasten them together by various means. Often, the cutting head is welded or otherwise joined to the shaft, and the piloting point is inserted into a square or other non-circular hole and held in place with a set screw.

Of course, as might be expected, the piloting points tend to work loose from the rest of the bit. Also, the cost of welding pieces together is a substantial part of the cost of manufacturing these bits.

A bit which does not require welding is shown in U.s. Pat. No. 2,593,823 "Wilson". That bit is intended for lighter duty than the present invention. In the Wilson patent, the cutting head of the bit is very short, which means that there is little thread engagement between the shaft and the cutting head, causing a tendency for instability of the head relative to the shaft. In that threaded arrangement, most of the forces between the cutting head and the shaft are borne in a very small area near the shoulder, thereby tending to cause failure of one or both parts at that point. Also, because the cutting head is so short, there will tend to be instability between the cutting head and the workpiece.

SUMMARY OF THE INVENTION

The present invention provides a self-feeding, wood-boring bit which avoids many of the problems of the prior art.

The present invention provides a two-piece bit in which a threaded pilot point is part of the shaft, and the cutting head has an axial through-bore which is threaded to receive the pilot point, so the two parts are held together in threaded engagement. The threaded joint between the shaft and cutting head is also glued together with a permanent glue to fill the spaces between threads and reduce the opportunity for misalignment between the head and shaft.

The present invention also provides an extended bearing surface area or bearing neck between the cutting head and the shaft in addition to the threaded joint area to improve alignment between the head and the shaft and to spread the forces over a large bearing surface, which greatly reduces the opportunity for shaft failure.

The present invention also provides for the use of two different materials for the head and shaft so that the head has optimum cutting capabilities and the shaft has optimum strength for transmitting torque and withstanding bending and shear stresses.

The present invention avoids the need for welding that involved substantial cost of manufacture in the prior art.

It also avoids the problem of pilot points working loose.

DESCRIPTION OF THE PREFERRED EMBODIMENT

Figure 5:
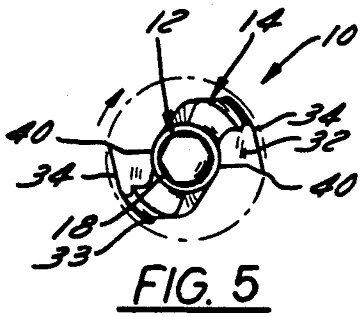
FIG. 5 is a top view of the drill bit of FIG. 1.
Figure 2:
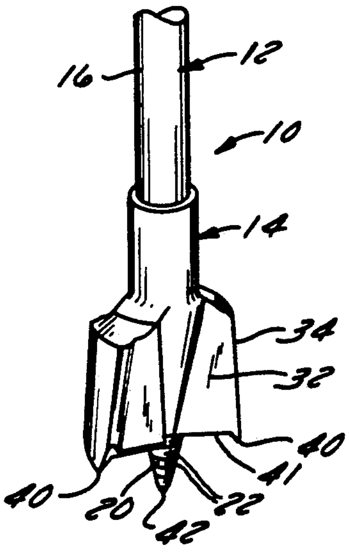
FIG. 2 is a broken-away perspective view of the drill bit of FIG. 1.
Figure 1:
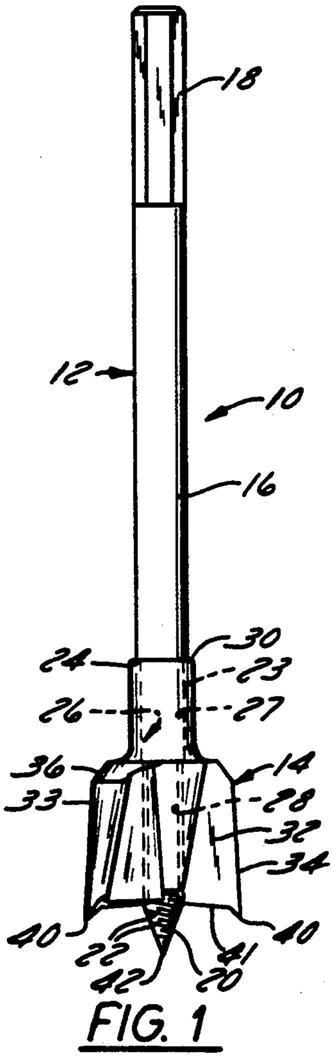
FIG. 1 is a front view of the drill bit of the present invention.
Figure 3:
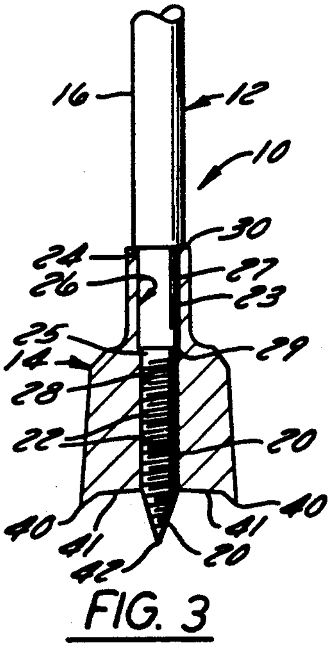
FIG. 3 is a front sectional view of the drill bit of FIG. 1.
Figure 4:
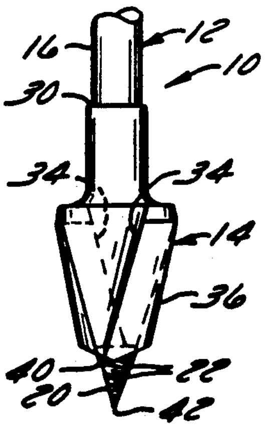
FIG. 4 is a right side view of the drill bit of FIG. 1.
Figure 6:
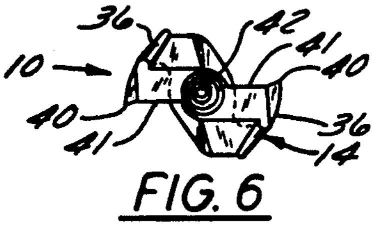
FIG. 6 is a bottom view of the drill bit of FIG. 1.

The drill bit 10 of the present invention is made up of two parts—the elongated shaft 12 and the cutting head 14.

The shaft 12 has an extended central portion 16 which has a circular cross-section. At one end of the central portion 16 is a driving end 18, which has a hexagonal cross-section. This driving end 18 is adapted to fit into the chuck of a drill which will drive the bit 10.

At the other end of the central portion 16 is a pilot point 20 which is threaded with tapering male threads 22 in the same way as a standard wood screw is threaded and ends in a sharp pointed tip 42. There is a bearing portion or bearing neck portion 23 on the shaft 12 between the central portion 16 and the threaded point 20. The bearing portion 23 has a smaller diameter than the central portion 16, and there is an upper shoulder portion 24 between the central portion 16 and the bearing portion 23. The an upper shoulder portion 24 has a larger diameter than the largest diameter of the threaded male end 20. There is a slight reduction in diameter from the bearing portion 23 of the shaft 12 to the threaded end portion 20 forming a lower shoulder portion 25 and a corresponding reduction in diameter from the mating bearing portion 27 in the head 14 to the mating threaded portion 28 of the head 14. This is necessary in order for the threaded portion 20 of the shaft to readily pass through the bearing portion 26 of the head during assembly.

The cutting head 14 has an axial through-bore 26 which has female threads in its lower portion 28 that are adapted to receive the male threads 22 of the pilot point 20 in threaded engagement. The upper sleeve portion 27 of the throughbore is unthreaded and has a larger cross-sectional diameter than the lower portion 28, defining a medial shoulder portion 29. The upper sleeve portion 27 is sized to receive the unthreaded bearing neck portion 23, and the medial shoulder portion 29 is sized to receive the lower shoulder portion 25 of the shaft with a snug fit. This sleeve portion 27 is preferably ⅝ inch long but must be at least ¼ inch long. The total length of the threaded pilot point 20 and the bearing portion 23 is longer than the length of the cutting head 14 along the central axis so that, when the cutting head 14 is threaded onto the pilot point 20, the end of the pilot point 20 projects outward beyond the cutting head 14. The top surface 30 of the cutting head 14 abuts the upper shoulder portion 24, thereby preventing the cutting head 14 from moving farther inward on the shaft 12.

The large bearing surface area between the unthreaded upper sleeve portion 27 of the cutting head 14 and the unthreaded bearing portion 23 of the shaft provides for proper alignment of the head 14 with the shaft 12. This large bearing surface area also causes the bending and shear forces on the shaft 12 to be greatly reduced from what they were on previous designs that did not have that area, thereby greatly reducing the opportunity for failure of the shaft. In other designs, most of the forces were concentrated in the region of the uppermost thread.

Also, in the preferred embodiment, the threaded portions of the shaft and head are glued together with a permanent adhesive during assembly in order to securely bind the two members together.

When the bit 10 is driven by a drill, the force of the wood or other substrate on the cutting head is in a direction which would further tighten the cutting head 14 onto the shaft 12, so there is no tendency for the cutting head 14 to work loose from the shaft 12 during use, even if the head 14 and shaft 12 are not glued together.

The cutting head 14 has front and back surfaces 32, 33, respectively, which terminate at the sides in edges 34. The forward-most portions of the edges 34 are the cutting points 40. The cutting edges 41 extend from the cutting points 40 radially inward to the bore 28. The cutting head has a rounded outer surface, including trailing wings 36. The trailing wings 36 are recessed radially inward from the cutting points 40 and provide stability to the drill.

When drilling begins, the pointed tip 42 of the pilot point 20 enters the wood or other substrate to keep the bit 10 centered on the substrate, and the threads 22 on the pilot point 20 begin to pull the bit 10 into the substrate. When the cutting points 40 reach the substrate, they begin to cut into the substrate. Then, the cutting edges 41 begin cutting forward into the substrate, shaving the substrate into small pieces which pass upward in front of the respective face 32 or 33 and out the top of the hole. As the bit rotates in a clockwise direction, the cutting force of the bit on the substrate is exerted in a clockwise direction, and the opposing force from the substrate is exerted in the opposite or counterclockwise direction, thereby causing the cutting head 14 to be tightened further inward onto the pilot point 20 to tightly abut the shoulder 24.

In the preferred method of manufacture of the bit 10, the shaft 12 is formed as one piece, and the cutting head 14 is cast as one piece. Then the faces 32, 33 are ground to sharpen the cutting edges 41. In order to make the axial through-bore 26 in the cutting head 14, first a hole is drilled through the cutting head with the diameter the same as the minor diameter of the threads 28. Then, the upper sleeve portion 27 is drilled to a diameter larger than the major diameter of the threads 27. Then the threads 27 are tapped in the lower portion of the cutting head 14. Threads 22 are also cut into the tapered pilot point 20. The bit is then assembled simply by threading the cutting head 14 onto the shaft 12 until it abuts the shoulder 24. A permanent glue is also used to hold the two pieces together.

Thus, the present invention has achieved an improvement in which a bit that was formerly assembled from several pieces that had to be welded or otherwise held together and that often came apart, is now made in a very simple manner in two pieces that are simply threaded together to achieve a strong, solid drill bit. The bit includes an elongated bearing surface to reduce bending and shear stresses on the shaft and to ensure proper alignment between the head and the shaft.

It will be obvious to those skilled in the art that modifications may be made to the preferred embodiment described above without departing from the scope of the present invention.

What is claimed is:

1. A drill bit, comprising:

an elongated shaft defining a driving end, a central portion, an extended bearing portion forming a cylindrical bearing neck along the longitudinal axis of said shaft, said bearing neck having a smaller cross-sectional diameter than the cross-sectional diameter of the lowermost part of said central portion, so as to define an upper shoulder portion therebetween, and, projecting downward from said bearing neck, a threaded male end having a smaller cross-sectional diameter than the cross-sectional diameter of said bearing neck, so as to define a lower shoulder portion therebetween, said threaded male end having a pointed tip to serve as a pilot; and a cutting head defining an axially stepped through-bore comprising a threaded lower portion to receive said threaded male end of said elongated shaft in threaded engagement and an unthreaded upper sleeve portion which has the proper internal diameters and lengths to receive the bearing neck portion and lower shoulder portion of the shaft with a snug fit.

2. The drill bit as recited in claim 1, wherein said upper sleeve portion of said cutting head abuts said upper shoulder portion of said shaft upon assembly.

3. The drill bit as recited in claim 1, wherein said upper shoulder portion of said shaft is located axially inward from said pointed tip a distance which is greater than the length of said axial through-bore of said cutting head, such that upon assembly, said unthreaded upper sleeve portion of said cutting head is abutting said upper shoulder of said elongated shaft, wherein said pointed tip of said threaded male end projects outward beyond said cutting head.

4. The drill bit of claim 1, wherein said bearing neck is longer in length along the longitudinal axis of said shaft than either said upper shoulder portion or said lower shoulder portion of said shaft.

5. The drill bit of claim 1, wherein said bearing neck is at least one-fourth of an inch long in length with respect to the longitudinal axis of said shaft.

6. The drill bit of claim 1, further including at least one set of flats on said driving end.

7. The drill bit of claim 1, wherein said cutting head comprises a main body defining a pair of front and a back surfaces terminating at the sides to form a pair of edges, a pair of cutting points formed at the forward most portions of said edges, and a pair of cutting edges extending from said cutting points radially inward to said shaft.

8. The drill bit of claim 7, wherein said cutting head has a rounded outer surface to provide stability to said drill bit.

9. The drill bit of claim 7, including a pair of trailing wings recessed radially inward from said cutting points to provide stability to said drill bit.

10. The drill bit of claim 1, including a permanent adhesive applied to the portion of said threaded male end which is threadably engaged with said cutting head.

11. The drill bit of claim 1, wherein said cutting head is comprised of harder material than said shaft.

12. The drill bit of claim 1, wherein said shaft is comprised of tougher material than said cutting head.

13. A drill bit, comprising:

an elongated shaft defining a driving end, a central portion, an extended bearing portion forming a bearing neck along the longitudinal axis of said shaft, said bearing neck having a smaller cross-sectional diameter than the cross-sectional diameter of the lowermost part of said central portion, so as to define an upper shoulder portion therebetween, and, projecting downward from said bearing neck, a threaded male end having a smaller cross-sectional diameter than the cross-sectional diameter of said bearing neck, so as to define a lower shoulder portion therebetween, said threaded male end having a pointed tip to serve as a pilot; and a cutting head defining an axial through-bore having a threaded lower portion to receive said male end of said elongated shaft in threaded engagement and an unthreaded upper sleeve portion having a larger cross-sectional diameter than said threaded lower portion, so as to define a medial shoulder therebetween, wherein said unthreaded upper portion and medial shoulder are of the proper diameter and axial length to receive the bearing neck portion and lower shoulder portion of the shaft with a snug fit.

14. The drill bit as recited in claim 13, wherein said upper shoulder is located axially inward from said pointed tip a distance which is greater than the length of said axial throughbore of said cutting head, such that upon assembly, said unthreaded upper sleeve portion of said cutting head is abutting said upper shoulder of said elongated shaft and said pointed tip of said threaded male end projects beyond said cutting head.

* * * * *